United States Patent [19]

Kim

[11] Patent Number: 5,727,088
[45] Date of Patent: Mar. 10, 1998

[54] ERROR CONCEALMENT METHOD IN A B-PICTURE

[75] Inventor: Seong-bong Kim, Seoul, Rep. of Korea

[73] Assignee: Samsung Electronics Co., Ltd., Kyungki-Do, Rep. of Korea

[21] Appl. No.: 588,812

[22] Filed: Jan. 19, 1996

[30] Foreign Application Priority Data

Jan. 23, 1995 [KR] Rep. of Korea .................. 95-1093

[51] Int. Cl.$^6$ .............. G06K 9/36; G06K 9/46; H04N 11/02; H04N 7/12
[52] U.S. Cl. .................. 382/238; 348/409; 382/232
[58] Field of Search ................... 348/384, 409, 348/390, 416, 426, 699, 402, 415, 413, 419, 420, 607, 610; 382/238, 232

[56] References Cited

U.S. PATENT DOCUMENTS

| | | | |
|---|---|---|---|
| 5,150,210 | 9/1992 | Hoshi et al. | 348/413 |
| 5,243,428 | 9/1993 | Challapali et al. | 348/607 |
| 5,247,363 | 9/1993 | Sun et al. | 348/607 |
| 5,410,553 | 4/1995 | Choon | 348/409 |
| 5,455,629 | 10/1995 | Sun et al. | 348/420 |

*Primary Examiner*—Leo Boudreau
*Assistant Examiner*—Wenpeng Chen
*Attorney, Agent, or Firm*—Sughrue, Mion, Zinn, Macpeak & Seas, PLLC

[57] ABSTRACT

When a data error is generated in a macroblock in a Bidirectionally-predictive coded picture (i.e., a B-picture), error concealment is performed on the macroblock. In the situation where the macroblock in the row just above and in the same column as the error-generated macroblock is an intra macroblock, the intra macroblock cannot be used to provide a motion vector for use in error concealment. In such a case, a method is provided to obtain a motion vector for the error-generated macroblock by taking the arithmetic average of the motion vectors of the macroblocks which are on each side of the macroblock just above the error-generated macroblock and in the same column. Error concealment by motion compensation is performed with respect to the corresponding macroblock in the same position in the B-picture which is either forward or backward in time sequence. Choice of whether the forward or backward B-picture is to be used is made adaptively, based upon whether a scene change is determined to have occurred.

3 Claims, 2 Drawing Sheets

ERROR CONCEALMENT METHOD IN A B-PICTURE

BACKGROUND OF THE INVENTION

The present invention relates to a system for decoding a bit sequence of a coded compressed video signal, and more particularly to an error concealment method capable of concealing an error with reference to pictures which are forward or backward in time with respect to a B-picture (Bidirectionally-predictive coded picture) when an error is generated in the B-picture which is composed of bit sequences.

Format and terms used in the present invention are employed pursuant to the MPEG standard on coding, compression and decoding of motion video data.

In order to compress motion video data effectively, the MPEG defines three types of picture, which are I-picture (Intra-coded picture), P-picture (Predictive-coded picture) and B-picture. Each type of picture is composed of a plurality of slice layers, each of which consists of numbers of macroblocks. A macroblock is composed of blocks being in pixel units. The forward picture corresponds to the picture which is earlier in time with respect to display order and the backward picture corresponds to the picture which is later in time with respect to display order. Such definitions are used in the MPEG standard and they are used throughout the current disclosure.

The I-picture is coded without reference to other pictures, and the P-picture is coded more efficiently based on motion-compensated prediction from the I-picture or the P-picture which is positioned forward in time of the picture being coded. The B-picture is coded most efficiently with reference to pictures which are placed forward and backward in time with respect of the picture being coded. To combine three types of pictures in the bit sequence of motion video data is very flexible according to decoder's selection.

When the coded compressed motion video data is decoded, the pictures are decoded in the transmitted order, thereby reproducing the original video data by using references of each picture FIG. 1A is an exemplary view showing pictures in order of display, and FIG. 1B is an exemplary view showing pictures in a decoding order.

In FIG. 1A, a B-picture B0 is currently being displayed. B-pictures B12 and B13 and a P-picture P14 which are placed forward from B-picture B0 are already displayed, while a B-picture B1 and a I-picture I2 which are placed backward from the B-picture B0 follow when the B-picture B0 is displayed.

On the other hand, a process for decoding coded pictures prior to displaying is performed differently from the order of display explained above. This is, since the B-picture is coded with reference to the forward and backward pictures, the backward picture referred in coding the B-picture is first decoded when decoding the B-picture. Thus, as shown in FIG. 1B, the backward picture I2 is first decoded before the current B-picture B0.

When an error is generated in bit sequence of motion video data either during transmission or in a decoding process, the motion image is not completely reproduced due to errors, or degradation in picture quality is caused as an error is further diffused in the decoding process.

Conventionally, in the art for error concealment, there is a method for obtaining a motion vector of a macroblocks having an error and performing motion compensation with reference to forward pictures. This method obtains a motion vector of a error-generated macroblock (i.e., a macro-block having a data error) from a motion vector of macroblocks which are placed at the row just above the error-generated macroblock, and executes error concealment by motion compensation with reference to forward pictures.

Regarding an intra macroblock, a concealment motion vector may be provided to obtain a motion vector of macroblocks which are placed at the row just below an intra macroblock which has no motion vector.

The conventional error concealment method has a drawback that, in the case that a macroblock which is placed at the row just above the same column as the error-generated macroblock is an intra macroblock having no concealment motion vector and that the error-generated picture (i.e., picture containing the error-generated macroblock) is a B-picture, the error concealment is performed by motion compensation with reference to the forward pictures only, irrespective of relation of a picture even when scene change is made just prior to the error-generated B-pictures, thereby causing degradation of picture quality in reproducing pictures.

SUMMARY OF THE INVENTION

To solve the above-described problem, it is one object of the present invention to provide a method for concealing an error of macroblocks, in which when performing error concealment for a B-picture, in the case that an error is generated in a specific macroblock of the B-picture and that a macroblock which is placed at the row just above and in the same column as an error-generated macroblock is an intra macroblock having no concealment motion vector, a motion vector of the error-generated macroblock is obtained using motion vectors of macroblocks which are located just above the error-generated macroblock, and then prediction pictures for motion compensation are adaptively selected from either forward picture or backward picture of the B-picture and are motion-compensated to perform error concealment, thereby reproducing a good picture in quality in spite of scene change from the B-picture.

To achieve the object of the present invention, there is provided an error concealment method in the B-picture, the method comprising the steps of:

(a) obtaining motion vector of an error-generated macroblock from macroblocks which are located at the row just above the error-generated macroblock;

(b) determining whether scene change is made, on the basis of the error-generated B-picture; and (c) performing motion compensation for the error-generated macro block with reference to the backward picture when there is scene change based on the scene change determination, while performing motion compensation for the error-generated macro block with reference to the forward picture when there is no scene change based on the scene change determination.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Figure 1A:
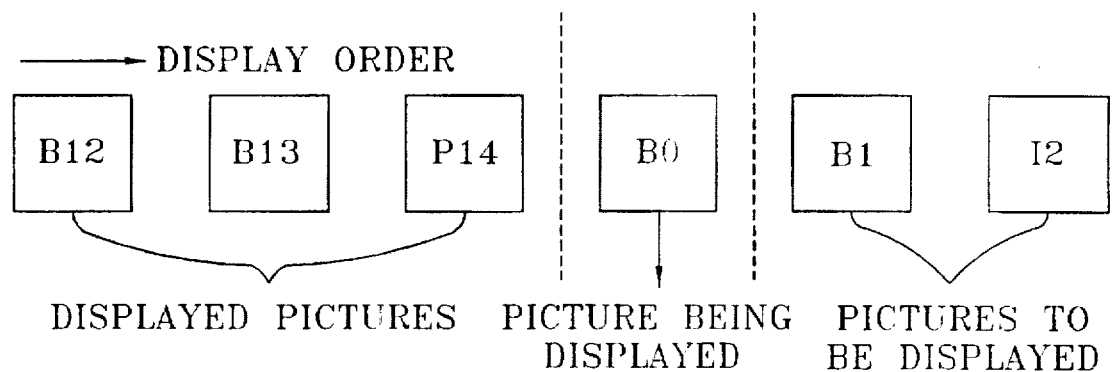
FIG. 1A is an exemplary view showing pictures in order of display.
Figure 1B:
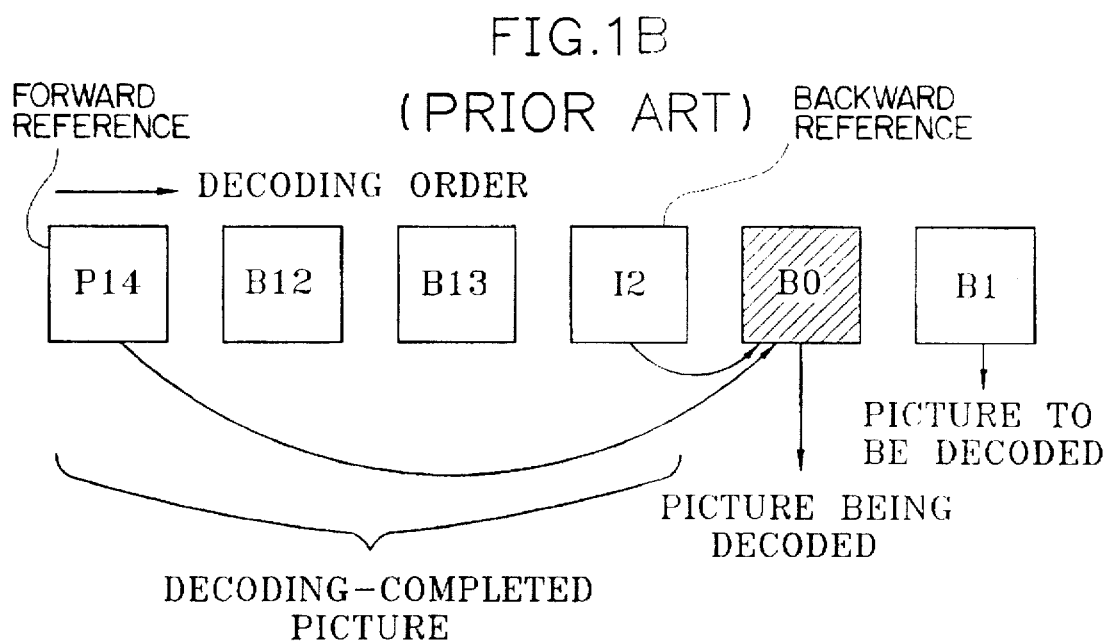
FIG. 1B is an exemplary view showing pictures in order of decoding.

A preferred embodiment according to the present invention will be described with reference to the drawing.

Figure 2:
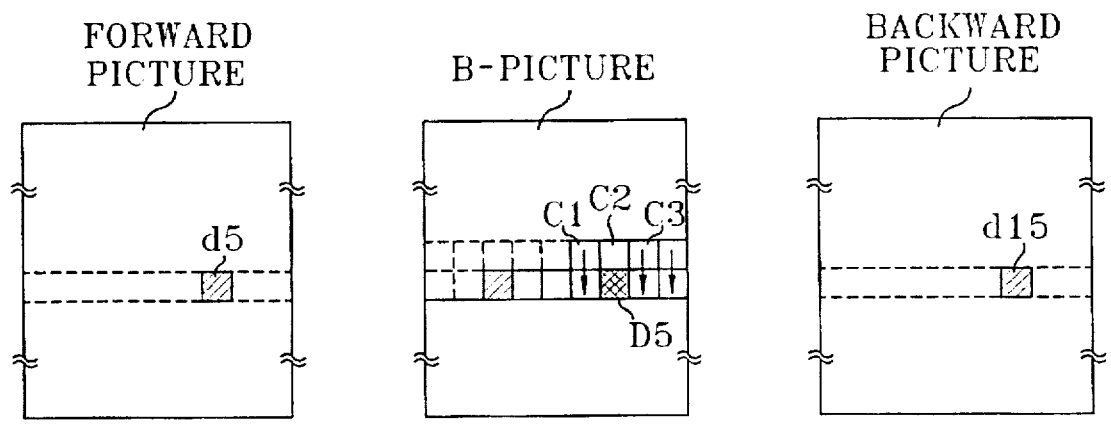
FIG. 2 is a conceptual view illustrating an error concealment method in a B-picture in accordance with the present invention.

Referring to FIG. 2, assuming that an error is generated in a macroblock D5 of a B-picture, and that a macroblock C2 which is placed at the row just above the same column as the macroblock D5, is an intra macroblock having no concealment motion vector, the motion vector of the macroblock in which an error is generated (i.e., D5) is first estimated in order to conceal the error of the macroblock.

Since the macroblock C2, which is placed at the row just above the error-generated macroblock D5, is an intra macroblock having no concealment motion vector, the motion vector of the error-generated macroblock is obtained with an arithmetic average of motion vectors of macroblocks C1 and C3 which are positioned on the both sides of the macroblock C2.

If any one or both the macroblocks C1 and C3 is an intra macroblock having no concealment motion vector, the motion vector of the error-generated macroblock is set to zero.

After the motion vector of the error-generated macroblock D5 is obtained, a reference picture for motion compensation is selected by the following method.

It is determined by scene change of the B-picture B0 whether a forward picture or a backward picture with respect to the error-generated B-picture B0 are referred to for motion compensation. If there is scene change, the backward picture is referred to, while if not, the forward picture is referred to.

Determination as to whether a scene change has occurred is made on the basis of the B-picture and is achieved by counting parameters added to the macroblocks. Each macroblock includes parameters of a macroblock-forward and macroblock-backward according to a degree of similarity with macroblocks which are in the same position on the forward and backward pictures. That is, when a macroblock is similar to the macroblock in the forward picture which is located at the same position, a macroblock-forward parameter is "1", and when a macroblock is similar to the macroblock in a backward picture which is located at the same position, the macroblock-backward parameter is "1".

The macroblock-forward or macroblock-backward parameters are counted for macroblock-forward or macroblock-backward parameters of the macroblocks which are placed at the line just above the error-generated macroblock. That is the macroblock-forward parameters or macroblock-backward parameters with respect to the macroblocks which are placed at the line just above the error-generated macroblock are counted respectively. When a counted value of the macroblock-forward parameters is larger than that of the macroblock-backward parameters, it is determined there is no scene change from the B-picture. On the contrary, when a counted value of the macroblock-backward parameters is larger than that of the macroblock-forward parameters, it is determined there is scene change from the B-picture.

If the counted value of the macroblock-forward parameters is equal to that of the macroblock-backward parameters, it is determined there is no scene change.

In the case that the error-generated B-picture has no scene change, motion compensation is performed with reference to the forward picture, while in the case that the error-generated B-picture has scene change, motion compensation is performed with reference to the backward picture.

In FIG. 2, in the case of a forward picture reference, motion compensation is executed with reference to a macroblock d5 which is in the same position as the error-generated macroblock in the forward picture. In the case of a backward picture reference, motion compensation is executed with reference to a macroblock d15 which is in the same position as the error-generated macroblock in the backward picture.

As described above, when performing error concealment for the B-picture, in the case that an error is generated in a specific macroblock of the B-picture and that a macroblock which is placed at the row just above the same column as the error-generated macroblock, is an intra macroblock having no concealment motion vector, the present invention obtains motion vector of the error-generated macroblock using motion vectors of other macroblocks which are placed at the row just above the error-generated macroblock. And then, prediction pictures for motion compensation are adaptively selected from either forward picture or backward picture of the B-picture and are motion-compensated, thereby performing error concealment. Accordingly, the present invention provides an error concealment method capable of reproducing a good picture in quality in spite of scene change from the B-picture.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A method for concealing an error which is generated in a macroblock, wherein the error is generated in a Bidirectionally-predictive coded picture (a B-picture), and wherein a macroblock which is disposed in the row just above and in the same column as the error-generated macroblock is an intra macroblock having no concealment motion vector, the method comprising the steps of:

(a) obtaining a motion vector for the error-generated macroblock from macroblocks which are disposed in the row just above the error-generated macroblock;

(b) determining whether scene change is made on the basis of the B-picture containing the error-generated macroblock; and (c) performing motion compensation for the error-generated macroblock with reference to the picture which is subsequent in time when there is scene change based on the determination result of step (b), and performing motion compensation for the error-generated macro block with reference to the picture which is preceding in time when there is no scene change based on the determination result of step (b).

2. The method for concealing an error claimed in claim 1, wherein said step (a) comprises the step that the motion vector of the error-generated macroblock is obtained with an arithmetic average of motion vectors of macroblocks which are positioned on the both sides of the macroblock which is disposed in the row just above and in the same column as the error-generated macroblock, in the case that two macroblocks on both sides of the macroblock which is disposed in the row just above and in the same column as the error-generated macroblock have motion vectors; and the motion vector of the error-generated macroblock is set to zero, in the case that any one of the two macroblocks on both sides of the macroblock which is disposed in the row just above and in the same column as the error-generated macroblock is an intra macroblock having no concealment motion vector.

3. The method for concealing an error claimed in claim 1, wherein said step (b) comprises the steps of:

(b1) counting macroblock-forward parameters and macroblock-backward parameters of the macroblocks which are disposed in the row just above the error-generated macroblock, and (b2) determining there is no scene change from the B-picture if a counted value of the macroblock-backward parameters is larger than that of the macroblock-forward parameters.

* * * * *